United States Patent
Ohdake et al.

(10) Patent No.: US 9,010,614 B2
(45) Date of Patent: Apr. 21, 2015

(54) WELDING TARGET POSITION MEASUREMENT DEVICE

(71) Applicants: Tatsuya Ohdake, Kanagawa (JP); Tetsuro Aikawa, Tokyo (JP); Yoshinori Satoh, Kanagawa (JP); Kazuo Aoyama, Tokyo (JP)

(72) Inventors: Tatsuya Ohdake, Kanagawa (JP); Tetsuro Aikawa, Tokyo (JP); Yoshinori Satoh, Kanagawa (JP); Kazuo Aoyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 40 days.

(21) Appl. No.: 13/714,527

(22) Filed: Dec. 14, 2012

(65) Prior Publication Data
US 2013/0098971 A1  Apr. 25, 2013

Related U.S. Application Data

(63) Continuation-in-part of application No. PCT/JP2011/003583, filed on Jun. 23, 2011.

(30) Foreign Application Priority Data
Jul. 2, 2010 (JP) .................................. 2010-151803

(51) Int. Cl.
*B23K 20/00* (2006.01)
*B23K 13/08* (2006.01)
*B23Q 16/00* (2006.01)
*B23Q 15/00* (2006.01)
*B23Q 15/007* (2006.01)
(Continued)

(52) U.S. Cl.
CPC ............... *B23K 37/00* (2013.01); *B23K 9/1272* (2013.01); *B23K 9/32* (2013.01)

(58) Field of Classification Search
USPC ............................. 228/102, 103, 8, 9, 10, 11
See application file for complete search history.

(56) References Cited

U.S. PATENT DOCUMENTS

| | | | |
|---|---|---|---|
| 5,107,093 | A | 4/1992 | Ekelöf et al. |
| 5,166,495 | A | 11/1992 | Ekelöf et al. |

(Continued)

FOREIGN PATENT DOCUMENTS

| | | |
|---|---|---|
| JP | 63-084776 | 4/1988 |
| JP | 03-099778 | 4/1991 |

(Continued)

OTHER PUBLICATIONS

Computer english translation of JP-08033979A.*

(Continued)

*Primary Examiner* — Erin Saad
(74) *Attorney, Agent, or Firm* — Oblon, Spivak, McClelland, Maier & Neustadt, L.L.P.

(57) ABSTRACT

According to an embodiment, a welding target position measuring device comprises: a groove wall welding part detection means for detecting a groove wall welding part based on a result of the calculation performed by a groove shape change amount calculation means; a weld bead end detection means for detecting a weld bead end based on a result of the calculation performed by a groove shape difference amount calculation means; and a welding target position selection means for obtaining a welding pass number of a subsequent pass in a welding information stored in a welding information recording means and selecting a welding target position of the subsequent pass which differs depending on welding positions based on results of the detection of the groove wall welding part and the weld bead end.

7 Claims, 3 Drawing Sheets

(51) Int. Cl.
 *B23Q 15/013* (2006.01)
 *B23K 37/00* (2006.01)
 *B23K 9/127* (2006.01)
 *B23K 9/32* (2006.01)

(56) References Cited

U.S. PATENT DOCUMENTS

2004/0156033 A1* 8/2004 Kanemitsu ............... 356/3.01
2013/0026148 A1* 1/2013 Aoyama et al. ......... 219/124.33

FOREIGN PATENT DOCUMENTS

| JP | 05-138349 | 6/1993 |
| JP | 08-033979 | 2/1996 |
| JP | 09-103873 | 4/1997 |
| JP | 09-141439 | 6/1997 |
| JP | 11-047930 | 2/1999 |
| JP | 11-077308 | 3/1999 |
| JP | 3011868 | 12/1999 |
| JP | 2000-024777 | 1/2000 |
| JP | 2000-033477 | 2/2000 |
| JP | 2002-144035 | 5/2002 |
| JP | 2005-334904 | 12/2005 |

OTHER PUBLICATIONS

Computer english translation of JP2000-033477A.*
International Search Report issued on Sep. 13, 2011 for PCT/JP2011/003583 filed on Jun. 23, 2011 with English Translation.
International Preliminary Report on Patentability Issued Feb. 21, 2013 in PCT/JP2011/003583 (English translation).
Written Opinion of the International Searching Authority Issued Sep. 13, 2011 in PCT/JP2011/003583 (English translation).

* cited by examiner

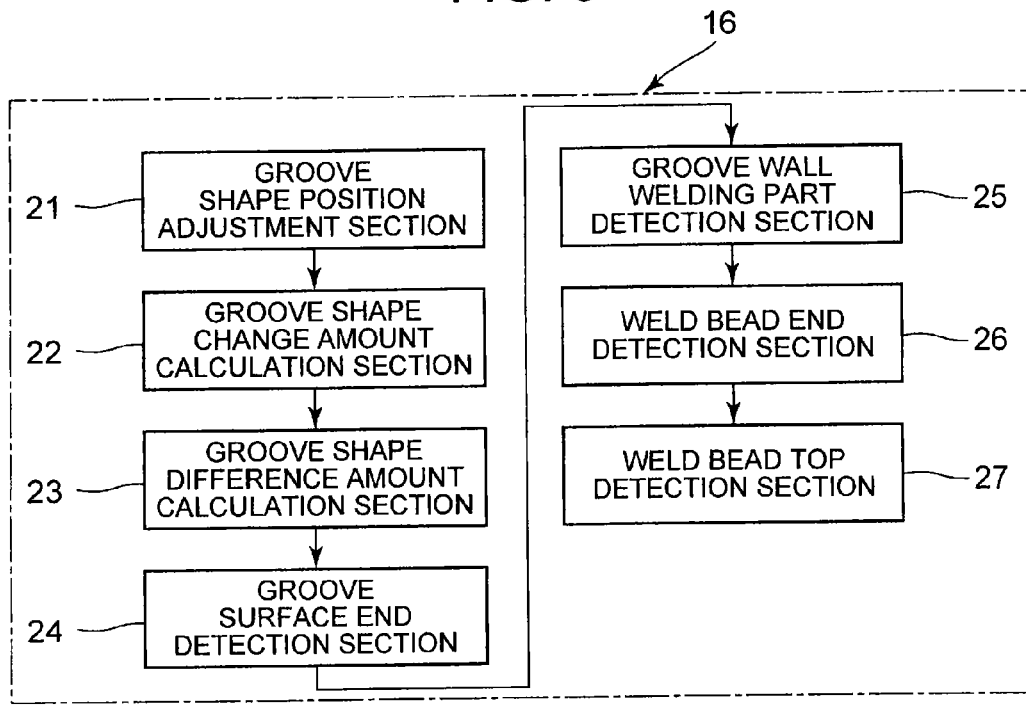
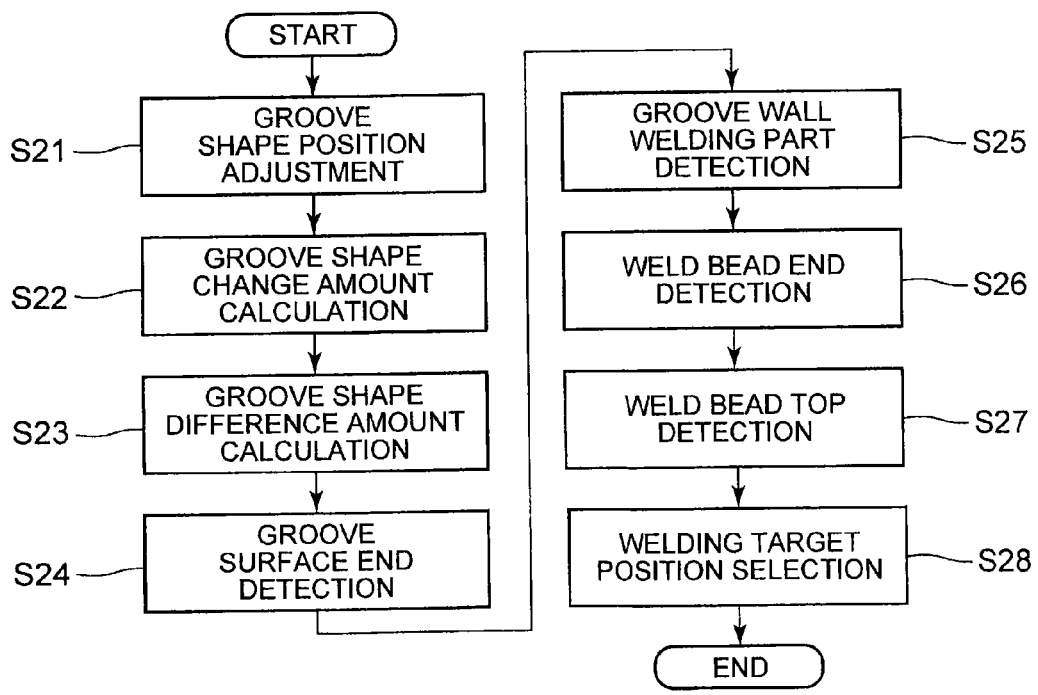

WELDING TARGET POSITION MEASUREMENT DEVICE

CROSS-REFERENCE TO RELATED APPLICATIONS

This application is a continuation-in-part (CIP) application based upon the International Application PCT/JP2011/003583, the International Filing Date of which is Jun. 23, 2011, the entire content of which is incorporated herein by reference, and claims the benefit of priority from Japanese Patent Application No. 2010-151803, filed Jul. 2, 2010, the entire content of which is incorporated herein by reference.

FIELD

The embodiments described herein relate to generally to a welding target position measurement device used when welding is applied to, e.g., a shroud of a boiling-water reactor, a waterwheel runner, or in-reactor piping.

BACKGROUND

In general, a welding target position, which is one of welding conditions, can be set based on, e.g., groove shape information. However, a shape of a weld bead does not always coincide with an estimated one, so that it is necessary to measure the welding target position from the shape of the weld bead before welding of a subsequent pass.

As a conventional technique, there is known a method that calculates a difference in cross section area of the weld bead between current and past shape data of the weld bead using a laser measurement system to control a welding speed of an automatic welding machine with a welding amount set as one of the welding conditions. Further, there is known another method that detects a changing point of a groove surface or the weld bead so as to control a target position. Further, as a method using an image, there is a method for dealing with a narrow groove, in which an end of the groove surface or weld bead bottom is detected through image processing to set the welding target position to a center of a groove width.

A technique described in Japanese Patent Application Laid-Open Publication No. 8-33979 (Patent Document 1), the entire content of which is incorporated herein by reference, uses an image of a groove shape obtained before or immediately after welding of a second or subsequent pass and an image of a groove shape obtained at the same position as that of a previous pass to perform image processing, calculates a contact point of a part departing from a part where the two images of groove shapes overlap each other, and determines the target position or the welding condition based on the calculated position. A technique described in Japanese Patent Application Laid-Open Publication No. 9-141439 (Patent Document 2), the entire content of which is incorporated herein by reference, is a welding method in which groove sensing is performed before a final pass operation of each layer.

However, as the welding target position, there can be considered not only a common V-shaped groove, but also an object to be welded having a wide groove width and a groove having a complicated shape changing in a three-dimensional manner. In such a case, a multiple pass per one layer welding method is adopted. In this method, the welding target position within the groove differs depending on a position of a welding pass, with the result that features on a weld bead thereof to be measured also differ.

In the above-mentioned welding techniques, it is difficult to set the welding target position of a subsequent pass due to application of the multiple pass per one layer welding method at a welding position or depending on a welding attitude at a welding position. The welding target position can be set based on groove shape information. However, as described above, a shape of the weld bead does not always coincide with an estimated bead shape as described above. This makes it difficult to measure the welding target position from the shape of the weld bead before welding of a subsequent pass and accurately select the welding target position.

Further, in the techniques described in Patent Documents 1 and 2, when the multiple pass per one layer welding is performed, a folding point is detected and the detected folding point is set as the welding target position, which poses a problem that it is not possible to obtain accurate welding target position information.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which:

FIG. 3 is a block diagram illustrating an internal configuration of a welding target position measurement processing section in the embodiment;

FIG. 4 is a flowchart illustrating welding target position measurement processing in the embodiment;

DETAILED DESCRIPTION

The present embodiments have been made in view of the above situation, and an object thereof is to provide a welding target position measurement device capable of obtaining more accurate welding target position information.

In order to achieve the above-mentioned object, according to an embodiment, there is provided a welding target position measurement device comprising: a welding target position measurement device comprising: groove shape measurement means for measuring a groove shape; groove shape recording means for recording shape data which is a measurement result of the groove shape; welding information recording means for recording welding information including at least a welding position and a welding pass number; groove shape position adjustment means for adjusting a position of current shape data to a position of past shape data; groove shape change amount calculation means for calculating a shape change amount based on the current shape data; groove shape difference amount calculation means for calculating a difference amount between the current and the past shape data; groove wall welding part detection means for detecting a groove wall welding part based on a result of the calculation performed by the groove shape change amount calculation means; weld bead end detection means for detecting a weld bead end based on a result of the calculation performed by the groove shape difference amount calculation means; welding target position selection means for obtaining the welding pass number of a subsequent pass in the welding information stored in the welding information recording means and selecting the welding target position of the subsequent pass which differs depending on welding positions based on results of the detection of the groove wall welding part and the weld bead end.

According to the present embodiments invention, it is possible to obtain more accurate welding target position information, thereby making welding quality stable and increasing efficiency of automatic welding operation.

An embodiment of a welding target position measurement device according to the present invention will be described below with reference to the accompanying drawings.

Figure 1:
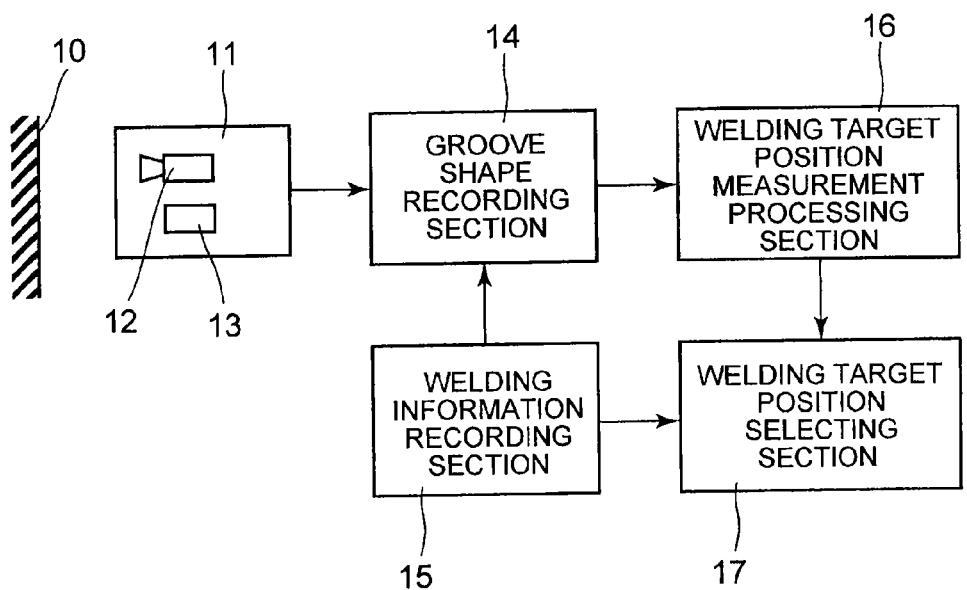
FIG. 1 is a block diagram illustrating an embodiment of a welding target position measurement device according to the present invention.

FIG. 1 is a block diagram illustrating an embodiment of a welding target position measurement device according to the present invention.

As illustrated in FIG. 1, a welding target position measurement device of the present embodiment has: a groove shape measurement section 11 including an image pickup device 12 installed at a position that can measure a groove shape of an object 10 to be welded and a light projector 13 that projects linear light; a groove shape recording section 14 that records shape data measured by the groove shape measurement section 11; a welding information recording section 15 that records welding information including a welding position, a welding pass number, a speed of a welding wire, and the like; a welding target position measurement processing section 16 that obtains current and past shape data and detects, based on the obtained shape data, a measurement point to serve as a welding target position; and a welding target position selecting section 17 that selects a welding target position of a subsequent pass based on the welding information recorded in the welding information recording section 15.

The following describes operation of the welding target position measurement device illustrated in FIG. 1.

As illustrated in FIG. 1, the groove shape measurement section 11 measures the groove shape of the object 10 to be welded. More specifically, the groove shape measurement section 11 uses the image pickup device 12 to detect the linear light projected by the light projector 13 and measures a distance in a horizontal direction and a distance in a depth direction. The shape data measured by the groove shape measurement section 11 is recorded in the groove shape recording section 14, where the shape data is managed in an integrated manner with the welding information, such as the welding position or welding pass number, of the welding information recording section 15.

The current and the past shape data are transmitted to the welding target position measurement processing section 16 so as to be subjected to various measurement processing thereby, and measurement points to serve as the welding target position are detected from the shape data. Then, the welding target position selecting section 17 obtains the measurement points as the welding information, such as the welding pass number, of the welding information recording section 15, whereby the welding target position of a subsequent pass can be selected. As a result, it is possible to measure and select the welding target position of a subsequent pass which differs depending on the welding position based on the shape data.

Figure 2:
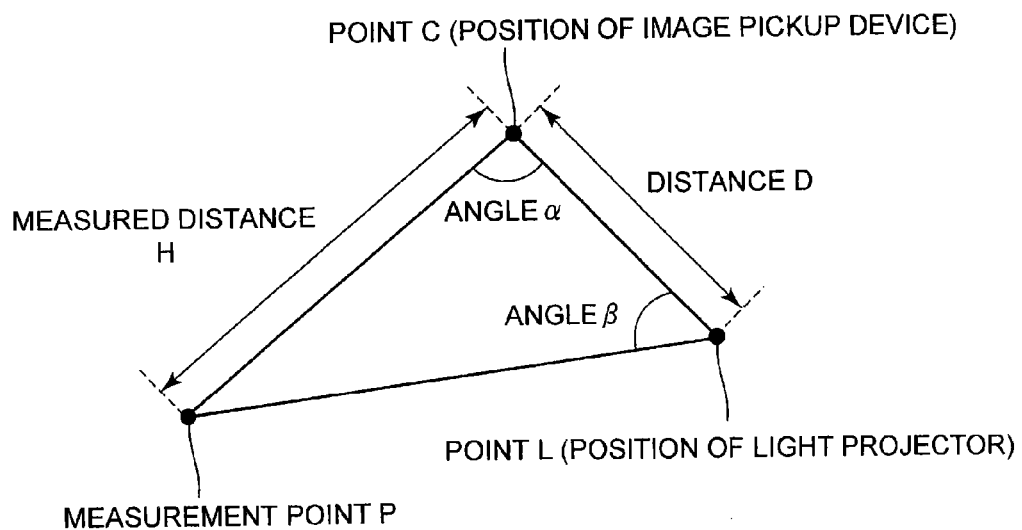
FIG. 2 is an explanatory view illustrating a distance measurement method performed by a groove shape measurement section in the embodiment.

FIG. 2 is an explanatory view illustrating a distance measurement method performed by the groove shape measurement section in the embodiment.

As illustrated in FIG. 2, assuming that a distance D between the image pickup device 12 and the light projector 13 is known and that a position of the image pickup device 12 is a point C and a position of the light projector 13 is a point L, a distance H between the point C and a measurement point P is a result of measurement of the groove shape of the object 10 to be welded.

If an angle $\alpha$, an angle $\beta$, and the distance D are known, the measured distance H can be represented as follows according to the sine theorem:

Measured Distance $H$=Distance $D \times \mathrm{Sin}\ \beta/\mathrm{Sin}\ (180-\alpha-\beta)$.

This distance measurement method is applied to a light pattern of the light projector 13, whereby a shape of an arbitrary area can be measured.

The shape data is recorded/managed in the groove shape recording section 14 in an integrated manner with the welding position or welding pass number recorded in the welding information recording section 15. As a result, when a light pattern of the light projector 13 is, for example, a single-line pattern, the shape data of the groove of the object 10 to be welded can be obtained as one measurement result of the distance measurement performed by the groove shape measurement section 11.

The following describes a configuration of the welding target position measurement processing section 16.

FIG. 3 is a block diagram illustrating an internal configuration of the welding target position measurement processing section in the embodiment.

As illustrated in FIG. 3, the welding target position measurement processing section 16 includes: a groove shape position adjustment section 21 that adjusts positions of the current and the past shape data, a groove shape change amount calculation section 22 that calculates a shape change amount based on the current shape data; a groove shape difference amount calculation section 23 that calculates a difference amount of the current and the past shape data to calculate a new weld bead part; a groove surface end detection section 24 that detects a groove surface end based on a result of the calculation performed by the groove shape change amount calculation section 22; a groove wall welding part detection section 25 that detects a groove wall welding part based on a result of the calculation performed by the groove shape change amount calculation section 22; a weld bead end detection section 26 that detects a weld bead end to serve as new welding end point based on a result of the calculation performed by the groove shape difference amount calculation section 23; and a weld bead top detection section 27 that detects a weld bead top based on a result of the calculation performed by the groove shape change amount calculation section 22.

Figure 5:
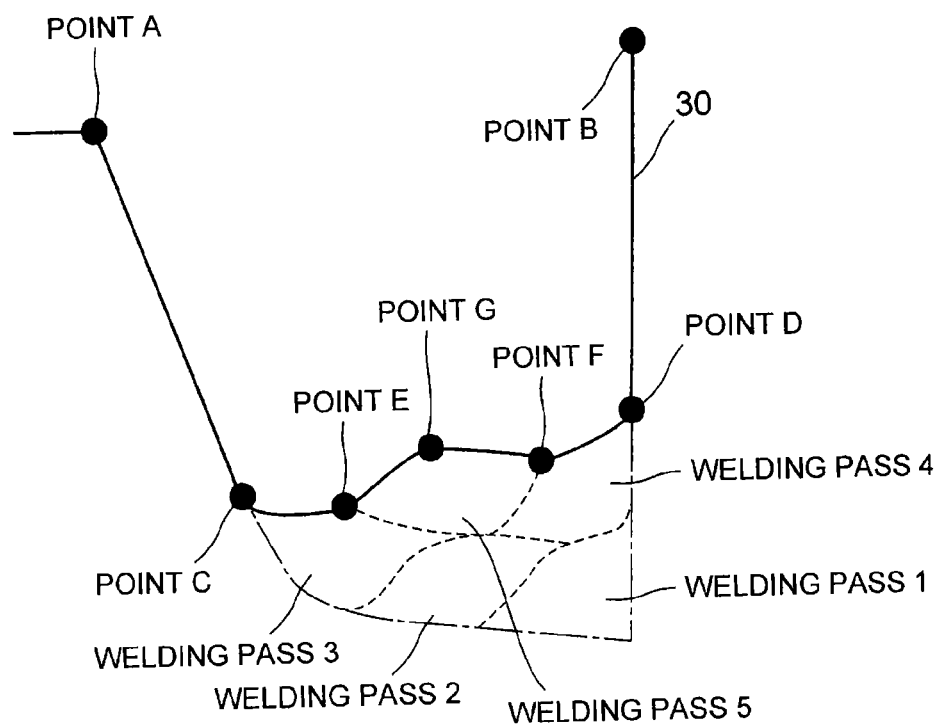
FIG. 5 is an explanatory view illustrating a weld bead in a groove cross section and measurement points therein in the embodiment.

FIG. 4 is a flowchart illustrating welding target position measurement processing in the embodiment. The welding target position measurement processing illustrated in FIG. 4 is executed by various measurement processing means provided in the welding target position measurement processing section 16 of FIG. 3. FIG. 5 is an explanatory view illustrating a weld bead in a groove cross section and measurement points therein in the embodiment.

First, in an example of FIG. 4, groove position adjustment processing in which position adjustment of step S21 is performed is executed so as to compare current shape data and past shape data. In FIG. 5, points A to G on a groove shape 30 each represent a point to be measured by the welding target position measurement device, and welding passes 1 to 5 represent a welding order of the welding passes. Hereinafter, a description will be made taking the welding pass 5 as an example. Further, in FIG. 5, a solid line denotes the current shape data, a broken line denotes the past shape data, and a dashed dotted line denotes the groove shape.

The following describes operation of the welding target position measurement processing section 16.

In the groove position adjustment processing of step S21, in order to compare the current shape data measured by the groove shape measurement section 11 with the past shape data recorded in the groove shape recording section 14, the groove shape measurement section 11 adjusts displacement in a welding position of the object 10 to be welded. First, a difference sum between the current shape data and the past shape data is calculated, and then a position at which the difference sum becomes minimum is calculated, whereby the displacement between the current shape data and the past shape data is adjusted. Thus, it is possible to minimize the displacement even if measurement positions of the current and the past shape data are displaced.

In groove shape change amount calculation processing of step S22, slopes of two lines at two zones including the measurement point selected from the number of calculation measurement points that can be set in the vicinity of the measurement point are calculated according to a least-squares method. An angle formed by the two lines including the measurement point is calculated from the obtained slopes of the two lines, and the calculated angle is set as a change amount of the groove shape. A change amount of 0 degrees indicates that no change has occurred at the measurement point, and a change amount of 90 degrees indicates that a significant change has occurred at the measurement point. The groove shape change amount calculation processing of step S22 is performed for all the measurement points. With the above processing, it is possible to provide an index for detecting a point at which the shape data changes and to detect the measurement points to serve as the welding target position.

In groove shape difference amount calculation processing of step S23, a difference amount between the current and the past shape data which have been subjected to position adjustment in the groove shape position adjustment processing of step S21 at each measurement point is calculated, that is, a new weld bead part is calculated.

In groove surface end detection processing of step S24, the points A and B which are groove surface ends illustrated in FIG. 5 are detected. Using the change amount of the current shape data calculated in the groove shape change amount calculation processing of step S22, measurement points having a maximum angle equal to or larger than a set threshold are detected. First, for the point A, the groove surface end detection processing is performed starting from the left side of FIG. 5 with a center position of the shape data set as a boundary to detect the measurement point having the maximum angle. Similarly, for the point B, the groove surface end detection processing is performed starting from the right side of FIG. 5 with a center position of the shape data set as a boundary to detect the measurement point having the maximum angle. However, as illustrated in FIG. 5, in a case where there is no measuring point at which the shape changes like the point A, an end of the shape data is set as the point B as a groove surface end. By detecting the groove surface end, it is possible to confine a range of the shape data in which the welding target position exists and to reduce a processing load.

In groove wall welding part detection processing of step S25, the groove wall welding parts illustrated in FIG. 5, that is, the points C and D each serving as a boundary between a welding base material and a welding part are detected. Using the change amount of the current shape data calculated in the groove shape change amount calculation processing of step S22, measurement points having a maximum angle equal to or larger than a set threshold are detected. First, the zone between the points A and B detected in the groove surface end detection processing of step S24 is set as the shape data to be processed, and angles in this zone which are equal to or larger than a set threshold are sorted in descending order. Then, sorting is made with respect to a horizontal direction of the shape data in FIG. 5 to set the leftmost measurement point in FIG. 5 as the point C and the right most measurement point in FIG. 5 as the point D as the groove wall welding part. Thus, it is possible to detect the groove wall welding part and thereby to detect the measurement point to be selected as the welding target position.

In weld bead end detection processing of step S26, the points E and F of FIG. 5 each serving as a weld bead end are detected. To detect the weld bead end, the difference amount between the current and the past shape data calculated in the groove shape difference amount calculation processing of step S23 is used to detect the measurement points exhibiting a difference amount equal to or larger than a set threshold. The shape data in a zone between the points C and D detected in the groove wall welding part detection processing of step S25 is set as a processing target. A zone between the points E and F detected in the weld bead end detection processing of step S26 is a part that has been newly welded. Thus, it is possible to detect the weld bead end and thereby to detect the measurement points to be selected as the welding target position.

Weld bead top detection processing of step S27 is processing for detecting the point G serving as a top of the weld bead. In this processing, the change amount of the current shape data calculated in the groove shape change amount calculation processing of step S22 is used to detect the measurement points having a maximum angle equal to or larger than a set threshold. The detected point G becomes a measurement point serving as the weld bead end of a subsequent pass depending on the position of the welding pass. Thus, it is possible to detect the weld bead top and thereby to detect the measurement points to be selected as the welding target position.

The following describes welding target position selection processing of step S28.

Figure 6:
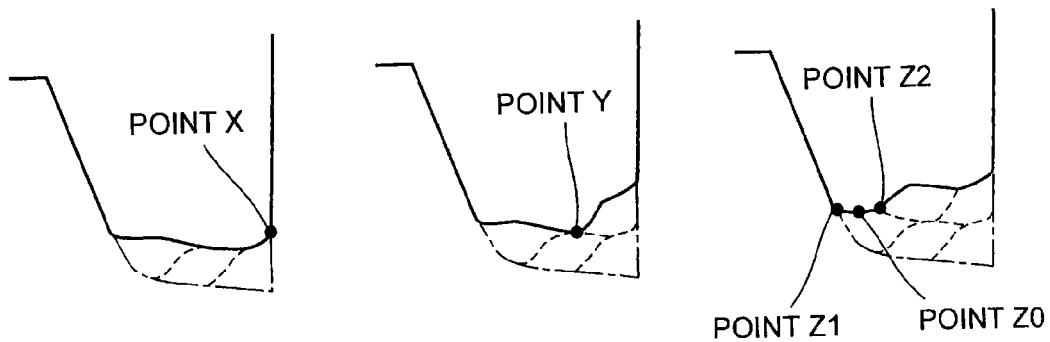
FIG. 6 is an explanatory view illustrating a welding target position in the embodiment.

FIG. 6 is an explanatory view illustrating a welding target position in the embodiment.

The points A and B each serving as the groove surface end, the points C and D each serving as the groove wall welding part, points the E and F each serving as the weld bead end, and the point G serving as the weld bead top illustrated in FIG. 5 which are detected through the processing from step S21 (groove shape position adjustment processing) to step S27 (weld bead top detection processing) are points to be measured in the welding target position selection processing of step S28.

First, the welding information including the welding position and welding pass number of the current shape data is obtained from the welding information recording section 15. Then, branching is performed for the welding position in a pass number subsequent to the current welding pass number depending on the welding positions. In an example of FIG. 6, the welding target position is a point X which is selected as the groove wall welding part of the point D and weld bead end of the point F of FIG. 5. A welding target position point Y is selected as the weld bead end of the point F of FIG. 5. Further, a welding target position point Z0 of the right part of FIG. 6 is selected as a middle point between the groove wall welding part of the point C of FIG. 5 corresponding to a point Z1 of FIG. 6 and the weld bead end of the point E in FIG. 5 corresponding to a point Z2 of FIG. 6.

As described above, according to the present embodiment, the current shape data, past shape data, change amount and difference amount of the shape data, welding information such as the welding position and welding pass number are obtained, and the welding target position of a subsequent pass which differs depending on the welding positions is selected based on the detection results of the groove wall welding part and weld bead end. As a result, it is possible to obtain more accurate welding target position information, thereby making welding quality stable and increasing efficiency of automatic welding operation.

The present invention is not limited to the above embodiment, but various modification thereof may be made. For example, although the welding information including the welding position, welding pass number, and speed of a welding wire is recorded in the welding information recording section 15 in the above embodiment, it is only necessary to record at least the welding position and welding pass number in the present invention.

What is claimed is:

1. A welding target position measurement device comprising:
   a groove shape detector configured to detect a groove shape as shape data;
   a groove shape recording unit configured to record the shape data detected by the groove shape detector;
   a welding information recording unit configured to record welding information including at least a welding position and a welding pass number;
   a groove shape position adjustment processor configured to adjust a position of current shape data to a position of past shape data;
   a groove shape change amount calculator configured to calculate a shape change amount based on the current shape data;
   a groove shape difference calculator configured to calculate a difference between the current and the past shape data;
   a groove wall welding part detector configured to detect ends of a groove wall welding part as measurement points based on the shape change amount calculated by the groove shape change amount calculator;
   a weld bead end detector configured to detect weld bead ends as measurement points based on the difference calculated by the groove shape difference calculator; and
   a welding target position selector configured to obtain the welding pass number of a subsequent pass in the welding information stored in the welding information recording unit, the welding target position selector configured to select the welding target position of the subsequent pass which differs depending on welding positions based on results of the detection of the groove wall welding part and the weld bead end,
   wherein the shape change amount calculated by the shape change amount calculator comprises an angle formed between two lines of the current shape data, each of the two lines extends from each of the measurement points to each of closest adjacent measurement points thereof, respectively,
   wherein the groove wall welding part detector is configured to detect a boundary point between a welding base material and a weld bead at one of the measurement points at which the angle between the two lines at the one of the measurement points is equal to or larger than a threshold based on the shape change amount calculated by the groove shape change amount calculator.

2. The welding target position measurement device according to claim 1, wherein
   the groove shape position adjustment processor is configured to compare the current shape data measured by the groove shape detector and the past shape data recorded in the groove shape recording unit and calculate a position at which a difference sum between the current shape data and the past shape data becomes minimum to adjust a displacement between the current and the past shape data.

3. The welding target position measurement device according to claim 1, wherein
   the groove shape change amount calculator is configured to calculate slopes of the two lines according to a least-squares method to calculate the angle therebetween.

4. The welding target position measurement device according to claim 1, further comprising a groove surface end detector configured to detect a groove surface end based on a result of the calculation performed by the groove shape change amount calculator, wherein
   the groove surface end detector is configured to detect the one measurement point at which a value of the angle between the two lines at the one of the measurement points is a maximum as the groove surface end.

5. The welding target position measurement device according to claim 1, wherein
   the groove wall welding part detector is configured to detect the measurement points having a maximum value of the angle calculated by the shape change amount calculator equal to or larger than a predetermined threshold as the boundary points.

6. The welding target position measurement device according to claim 1, wherein
   the weld bead end detector is configured to extract the current shape data at a portion where the difference calculated by the groove shape difference calculator is equal to or larger than a predetermined threshold as a new welding part, and to detect both end points of the new welding part as newly welded current weld bead ends.

7. The welding target position measurement device according to claim 1, further comprising:
   a weld bead top detector configured to detect a weld bead top based on the shape change amount calculated by the groove shape change amount calculator, wherein
   the weld bead top detector is configured to extract the current shape data between newly welded weld bead ends obtained by the weld bead end detector and to detect the one measurement point at which a value of the angle between the two lines at the one of the measurement points calculated by the shape change amount calculator exceeds a threshold as a weld bead top based on the shape change amount.

\* \* \* \* \*